Nov. 23, 1926.  
W. C. STEVENS  
1,608,193  
WINDING AND REELING MECHANISM  
Filed Dec. 11, 1922   6 Sheets-Sheet 1

Inventor  
William C. Stevens  
By G. L. Ely  
Attorney

Nov. 23, 1926.

W. C. STEVENS 1,608,193

WINDING AND REELING MECHANISM

Filed Dec. 11, 1922        6 Sheets-Sheet 2

Inventor
William C. Stevens
By G. L. Ely
Attorney

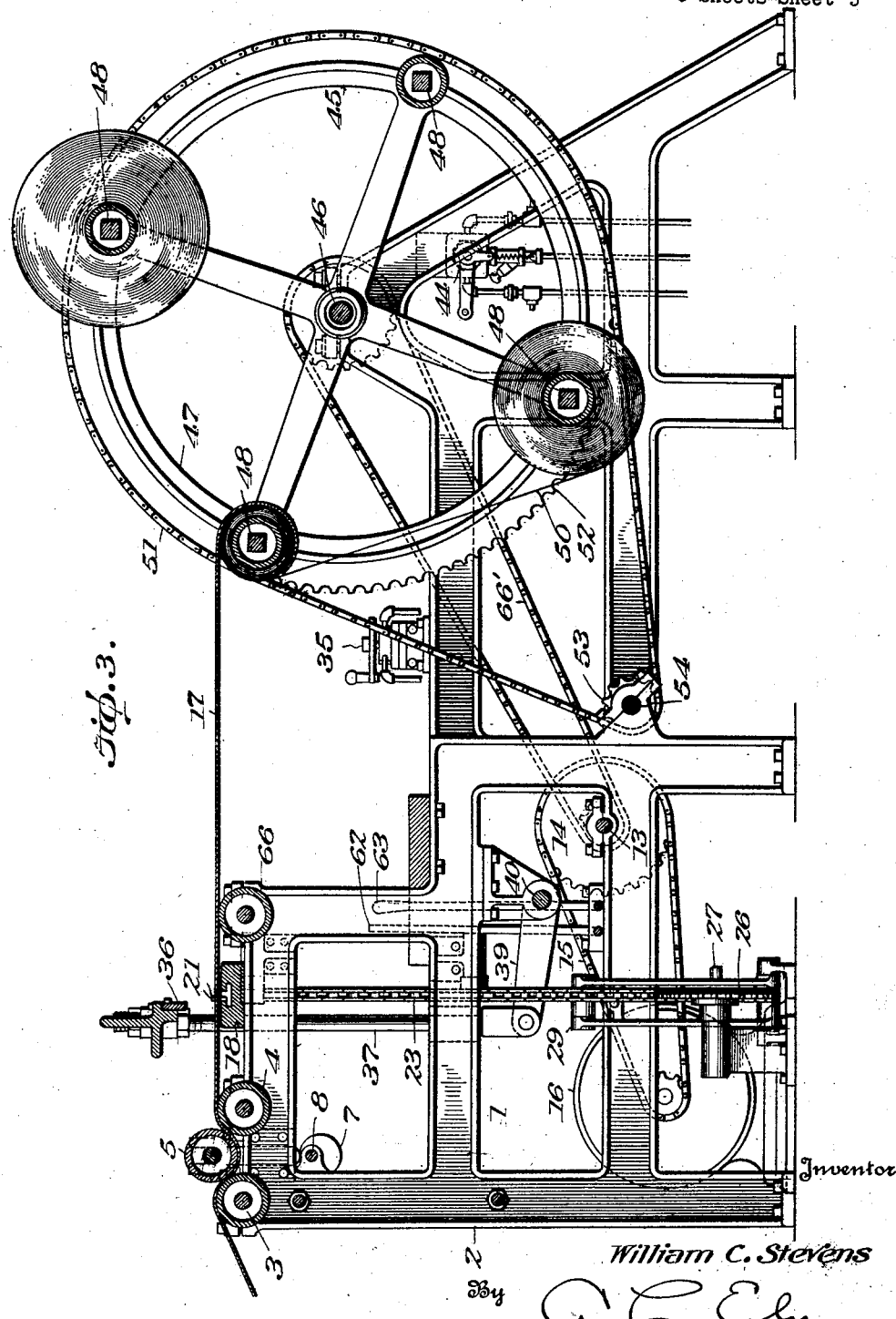

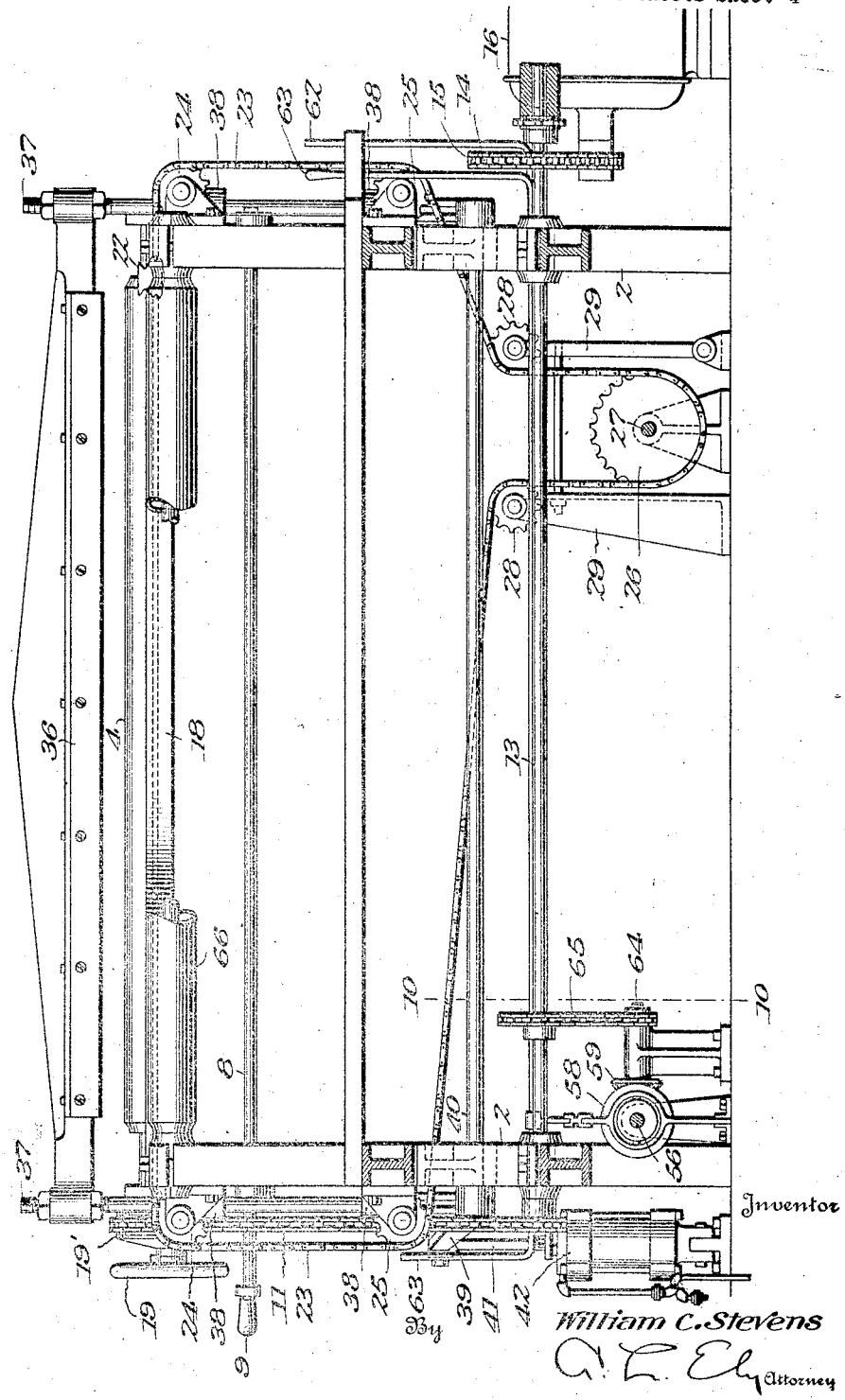

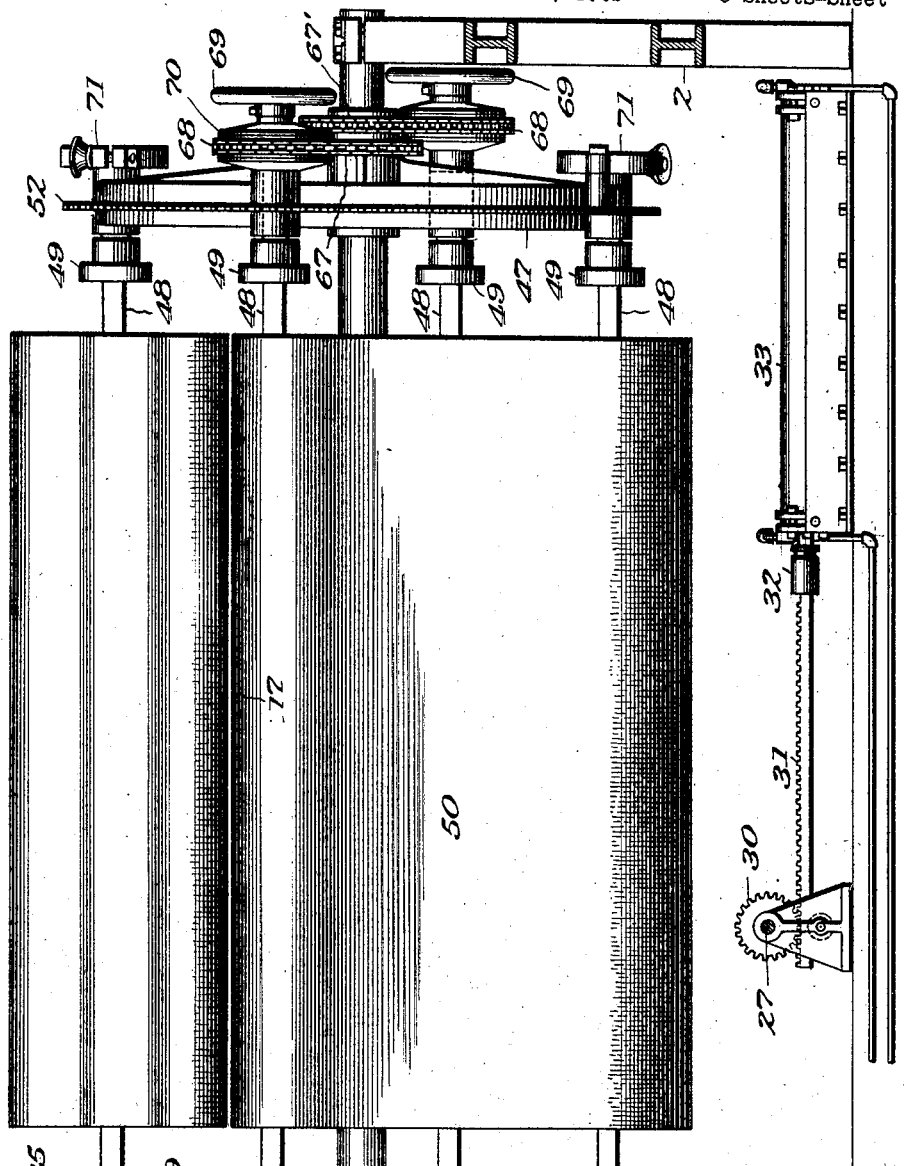

Nov. 23, 1926.
W. C. STEVENS
1,608,193
WINDING AND REELING MECHANISM
Filed Dec. 11, 1922   6 Sheets-Sheet 6
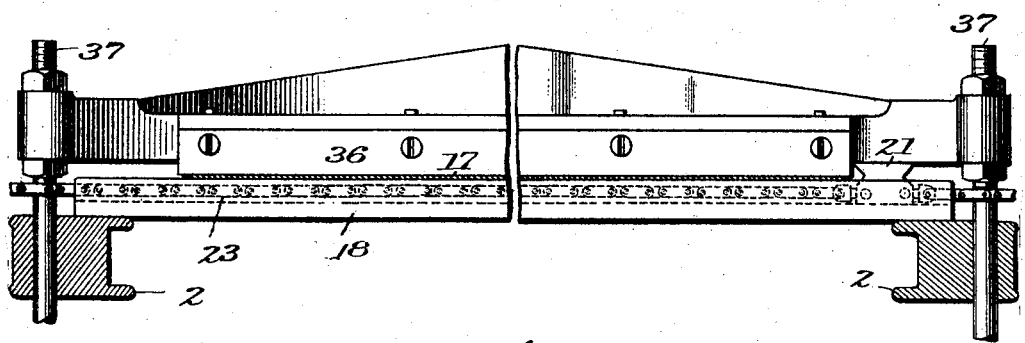
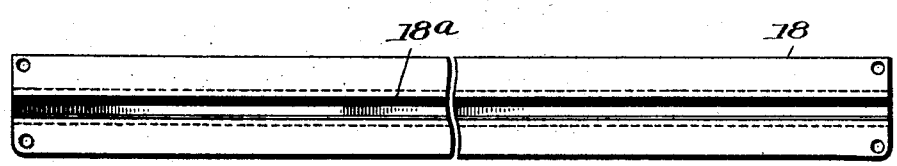
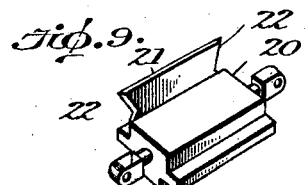
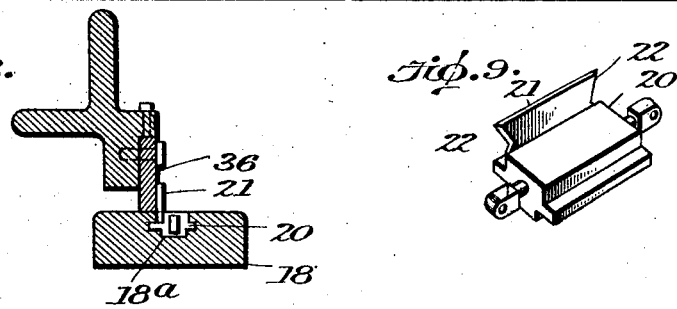
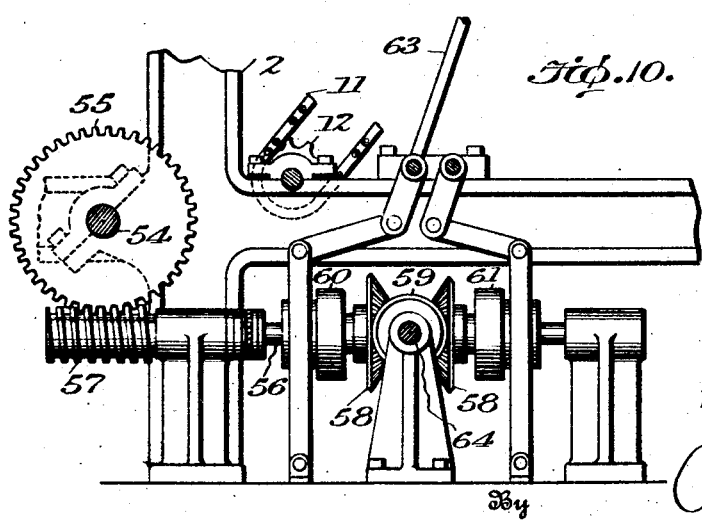
Inventor
William C. Stevens
By
Attorney Patented Nov. 23, 1926.

1,608,193

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

WINDING AND REELING MECHANISM.

Application filed December 11, 1922. Serial No. 606,017.

My invention relates to mechanism for use in winding up a continuous strip or web of material, and it comprehends, particularly, a continuous wind-up mechanism for use in reeling up rubber coated fabric such as that used in the manufacture of pneumatic tires.

According to one method of preparing tire fabric, it is passed, in a substantially continuous strip, or web, through a battery of calenders to apply various coatings of rubber to the fabric in succession. In order that this continuous calendering operation be advantageously performed it is essential that the calendered strip be taken up, as it issues from the battery, and without injuriously tensioning or otherwise distorting it. A continuous strip of this character is difficult to handle because of the tacky nature of the coatings, and its propensity to stretch under slight tension, particularly when it is cord fabric, so called, in which there are no weft threads.

The broad purpose of my invention is to provide a mechanism that is adapted, particularly, for use with such a battery unit to continuously take up the fabric as it issues from the battery and wind it together with a liner strip into a plurality of rolls for future use, without interrupting the calendering operation.

Another purpose of the invention is to provide mechanism for winding up such fabric at the same rate of speed as that at which it issues from the calenders to thereby prevent tensioning the fabric to an injurious degree.

My invention is also directed toward providing a wind-up mechanism that is adapted for severing the strip, when a roll thereof has been wound, without distorting the threads or wrinkling the strip or otherwise injuring it.

Still another purpose of my invention is to provide for holding the severed end of the unwound portion of the strip to prevent it from being pulled from the wind-up mechanism by its own weight.

My invention is not, however, confined to the precise use above indicated, but it may be utilized in other capacities where it is desired to wind up a strip of material other than fabric.

The foregoing as well as other objects and advantages of the invention will appear, when the following description and claims are read, and by reference to the drawings accompanying and forming a part of this specification.

In the drawings:

Figure 3 is a longitudinal central section through Figure 1;

Figure 4 is a transverse sectional view, on the line 4—4 of Figure 1, looking in the direction indicated by the arrows;

Figure 5 is a transverse sectional view on the line 5—5 of Figure 1, looking in the direction indicated by the arrows;

Figure 6 is a transverse sectional view on the line 6—6 of Figure 1;

Figure 7 is a plan view of a knife guide forming a part of my invention;

Figure 8 is a transverse sectional view on the line 8—8 of Figure 6;

Figure 9 is a perspective of a knife element also forming a part of my invention; and Figure 10 is a sectional view taken on the line 10—10 of Figure 4 and looking in the direction of the arrows.

Figure 1:
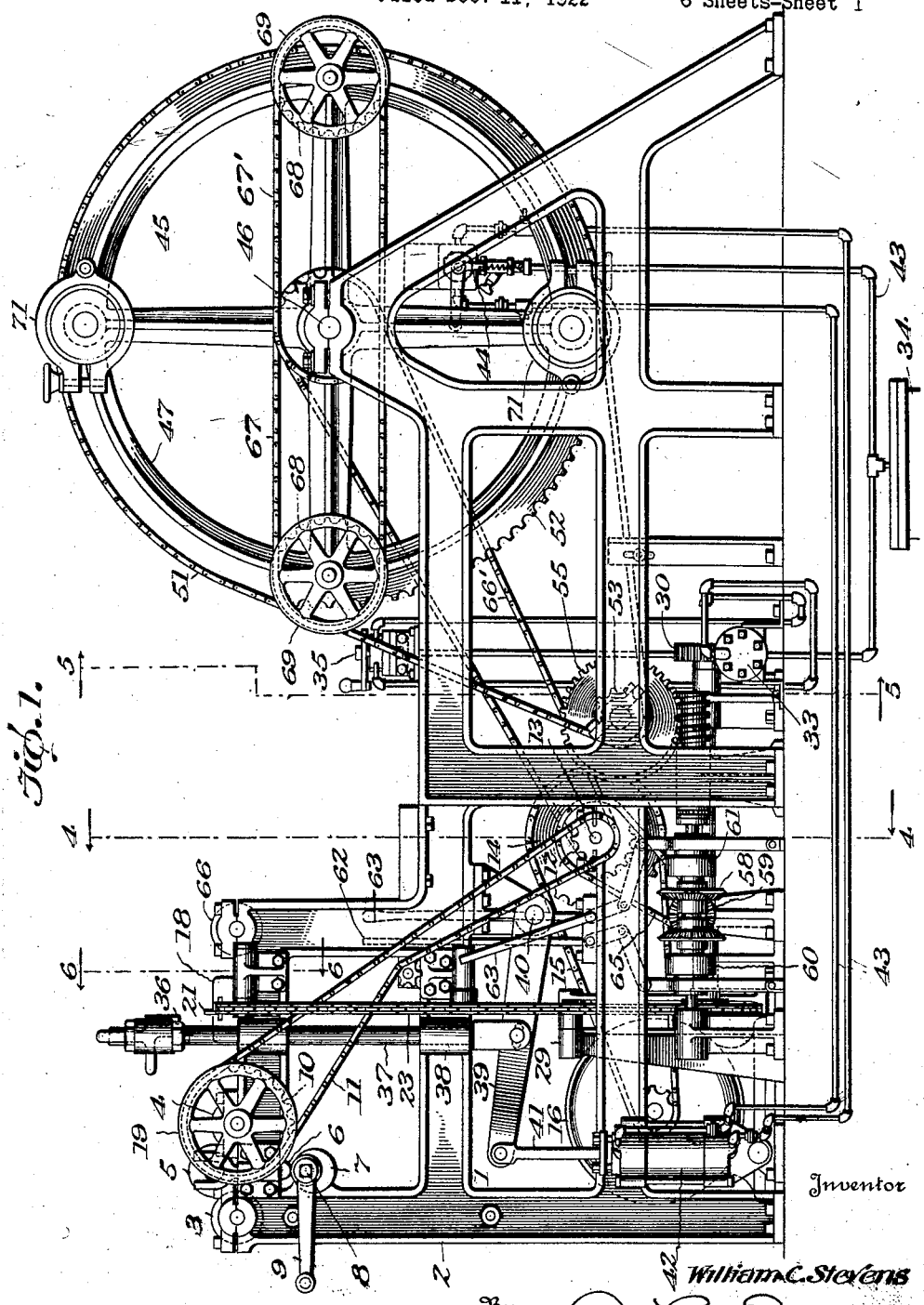
Figure 1 is a side elevational view of a preferred embodiment of my invention.
Figure 2:
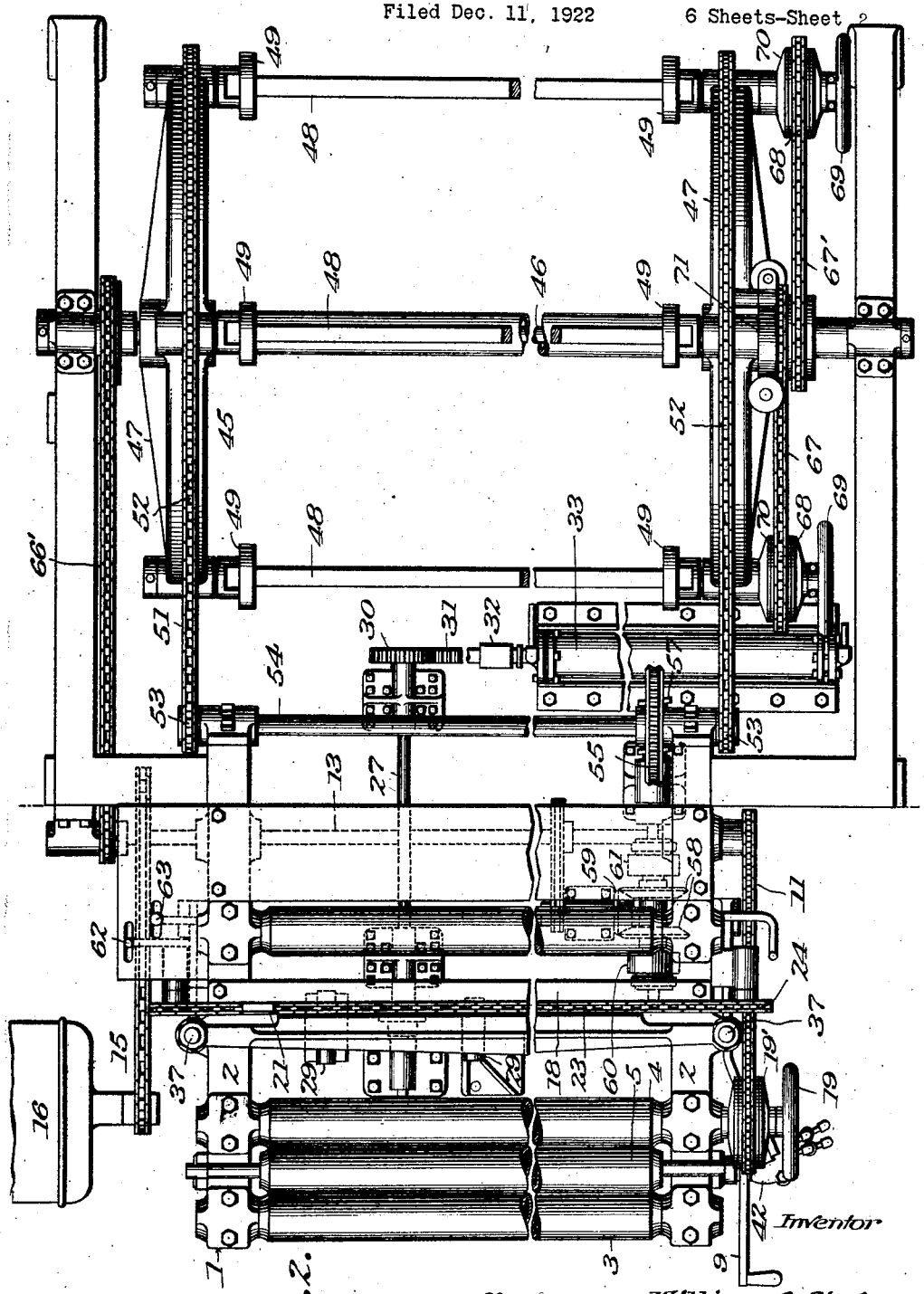
Figure 2 is a top plan view thereof, partly broken away.

Referring to the drawings by numerals, 1 designates, generally, a base structure comprising two parallel side frame members 2 which support the major portion of my mechanism. Between the upper forward ends of the frame members 2, a pair of horizontal rollers, 3 and 4, respectively, are journaled at a slight distance apart over which the strip travels on its way to the winding mechanism.

A presser roll 5 is mounted above and intermediate the rollers 3 and 4 to bear against the latter and is adjustable in a vertical plane by means of slidable bearings 6, the lower ends of which engage with cams 7. The cams 7 are carried upon a journaled shaft 8 that is provided with a crank 9. The roller 4 carries a sprocket wheel 10 which is connected by a chain 11 with a sprocket 12. The sprocket wheel 12 is affixed to one end of a rotary shaft 13 that extends transversely of the base 1. A sprocket wheel 14 is affixed to the other end of the shaft 13 and is connected by a chain 15 to a motor 16, whereby the shaft 13 is continuously driven. The fabric strip 17 is led from the calender unit (not shown) over the rollers 3 and 4 and under the roller 5. Roller 5 is designed for adjustment to effect substantially a frictional contact between the fabric and the rollers 3 and 4, so that when the strip 17 is severed at the rear side of the rollers, by means presently described, the end between the rollers will be held from pulling out by the weight of the strip. Rollers 3, 4 and 5 are arranged to be driven at substantially the speed as that at which the strip is wound, as will presently appear. A friction clutch 19' is provided upon the roller 4 having a hand wheel 19 by which the roller may be operated to connect it and the sprocket wheel 10 with the said roller 4 so that the roller is rotated to feed the strip through the rolls 3, 4 and 5. In the rear of the roll 4, a horizontal guide bar 18 is mounted upon the members 2 parallel with the rollers 3, 4 and 5 and across the path of travel of the strip. The bar 18 is flat upon its upper face to form a table over which the fabric passes, and it is positioned so that the strip travels in substantially a horizontal plane from the roll 4. A groove 18$^a$, substantially T-shaped in cross-section, is formed centrally of the guide 18 and lengthwise thereof. A slide 20, corresponding in cross-section to the groove 18$^a$, is mounted in said groove to reciprocate beneath the strip of material 17. The slide 20 carries a vertical knife 21 that projects above the slide and the bar 18, and is provided with cutting ends 22 so that it will cut when the slide is moved in either direction and tend to hold the strip against the bar 18. I prefer to form the knife with notched ends to hold the strip against the bar 18 during the cutting operation.

The block 20 and the knife 21 are reciprocated in the groove 18$^a$ by means of a sprocket chain 23, the ends of which are connected, respectively, to opposite ends of the block 20 and are trained over idler sprockets 24 at each end of the bar 18. From the idlers 24, the chain passes downwardly over other idler sprockets 25. The loop of the chain 23 passes around a sprocket wheel 26 which is fixed upon the forward end of a driven shaft 27. Upon each side of the sprocket 26, idler sprockets 28 are mounted in standards 29 adapted for adjustment to take up slack in the chain 23. The shaft 27 extends lengthwise of the base 1 and carries a toothed pinion 30 upon its rear end. The pinion 30 is rotated by a rack 31 carried upon a piston rod 32 that projects from an air cylinder 33. Air is admitted alternately into either end of the cylinder from a source of supply indicated at 34 through any suitable arrangement of connections. A control valve 35 is provided to direct the air into and from the cylinder 33 so that the knife may be quickly moved in either direction at will. Through the use of the air cylinder 33 and the rack and pinion connection, a very quick travel of the knife 21 is effected and the travel of the strip over the bar 18 is not interrupted to such a degree that it is tensioned injuriously during the winding operation, as will presently appear.

Prior to the cutting operation the strip 17 is clamped upon the forward edge of the bar 18 by a reciprocating clamping bar 36 that descends upon the bar 18 parallel therewith, and immediately adjacent the path of travel of the knife 21. The clamping bar 36 is also adapted to be quickly operated so as not to interrupt the passage of the fabric strip 17. It is supported at each end upon vertical rods 37 that are slidably mounted in bearings 38 upon the frames 2. At their lower ends the rods 37 are pivoted to vertically swinging levers 39 which have their rear ends pivoted to the frames 2, as at 40. The forward end of one of the levers is raised and lowered by a piston rod 41 projecting from a second air cylinder 42. A suitable arrangement of pipe circuits 43 connects the cylinder 42 with the source of supply 34 and a control valve 44 is provided to direct the movement of the piston at will.

At the rear end of the base 1, a rotatable reel 45 is mounted. Reel 45 comprises a constantly driven shaft 46 journaled between the frames 2 and provided adjacent each end with a spider 47 mounted to rotate freely upon the shaft 46. Between the spiders 47 a plurality of horizontal spindles 48 are mounted with their ends removably supported in chucks 49 which are in turn rotatable upon the spiders. An even number of spindles are provided, in the present instance four. Alternate spindles are designed to support, respectively, rolls of liner material designated 50. The intermediate spindles receive the fabric strip 17 together with the liner strip from the adjacent liner spindles and wind them into rolls. The intermediate spindles have a common winding position relative to the support or guide 18 on which they are moved in the following manner. The reel 45 is rotated, preferably clockwise, until one of the strip receiving spindles is substantially in the plane of the bar 18, by means of sprocket chains 51 that engage toothed peripheral portions 52 of the spiders 47 and also sprocket wheels 53 fixed upon a rotary shaft 54. Shaft 54 is journaled between the frames 2 and carries a worm wheel 55. A short driven shaft 56 extends beneath the worm wheel 55 toward the front of the base 1 and carries on its rear end a worm 57 in mesh with the worm wheel 55. Intermediate its length the shaft 56 carries a pair of oppositely disposed, freely rotatable beveled gears 58 which are in mesh with a driving gear 59 and constitute therewith a forward and reverse drum for the reel 45. Suitable clutch elements 60 and 61, respectively, are provided for clutching either gear 58 to the shaft 56, the clutches being operated respectively by hand levers 62 and 63. The gear 59 is fixed upon one end of a continuously rotating stud shaft 64 which is driven by a sprocket and chain connection 65 to the continuously rotating shaft 13. When one of the strip receiving spindles is properly positioned, the end of the strip 17 is led over an idler 66, in front of the bar 18 and together with the end of the liner strip, from the liner roll 50 immediately below, is given several turns around the strip receiving spindle. The strip receiving spindle is now rotated through the following devices. A sprocket and chain connection 66' leads from the shaft 13 to one end of the shaft 46 of the reel whereby said shaft is continuously rotated. At the opposite end of the shaft 46 individual sprocket and chain connections 67 and 67', respectively, lead to an individual sprocket wheel 68 upon the end of each strip receiving spindle. The sprocket wheels 68 are free to rotate upon their respective supporting spindles and hand wheels 69 and disc clutch elements 70 are provided for each of these latter sprockets so that the strip receiving spindles may be driven from the shaft 46 or disconnected therefrom. In order that the liner strip 50 may be evenly wound with the strip 17, friction brakes 71 may be provided on the ends of these spindles, if desired. When a roll of the strip 17 of sufficient size is wound, the clamping bar 36 and the knife 21 are actuated as previously described to sever the strip. Rollers 3, 4 and 5, as before mentioned, serve to hold the severed ends of the unwound portion of the strip 17 against rearward movement through the weight of the strip in front of the machine when the clamping bar raises. The reel 45 is next rotated until a fresh strip receiving spindle and liner roll are in the position before described relative to the bar 18. The full strip receiving spindle and its adjacent liner spindle may now be removed and replaced with a fresh strip spindle and a new roll of liner material. While this latter operation is being effected, the operation of winding the strip 17 upon the newly presented strip receiving spindle may be performed, as will be obvious. The foregoing operations are then repeated. As many sets of spindles may be provided upon the reel 45 as desired and commensurate with its circumference. Inasmuch as the operation of rotating the reel may be very quickly accomplished, it will be apparent that the strip 17 may be wound in substantially a continuous operation. The drive for the strip receiving spindles, and the rolls 3, 4 and 5, is so designed that their speed or rotation may be varied in accordance with the speed at which the strip issues from the calendering unit to regulate the tension at which the strip is wound. As before mentioned, however, the rolls 3, 4 and 5, and the strip receiving spindles are rotated at substantially the same speed so that the strip will not be tensioned between the reel and the said rolls. Also the strip severing devices are under a separate control whereby the strip 17 may be severed as well, to provide for different lengths being wound upon the spindles, or different sizes of rolls.

The foregoing constitutes a detailed description of a preferred embodiment of my invention, but it is not to be construed as limiting me to the precise arrangement and construction of parts herein described, as various changes and modifications may be made in the mechanism described without departing from the spirit of my invention or the scope of the appended claims.

What I claim is:

1. In mechanism of the class described, in combination, a plurality of rotary spindles mounted to revolve about a common axis, means for revolving the spindles, a support parallel with said axis of rotation, a transversely reciprocable cutter element upon the support, a reciprocable clamp adapted to engage the support, a plurality of strip engaging rollers adjacent the support, and means for rotating said rollers and one of the spindles in unison.

2. In mechanism of the class described, in combination, means for supporting a moving strip of material, a transversely reciprocating cutter element upon the support, means adapted to clamp the strip against the support, rotary means for engaging and holding one severed end of the strip against movement in one direction, and means for rotating said last means at substantially the speed of movement of said strip.

WILLIAM C. STEVENS.